United States Patent [19]

Nguyen et al.

[11] Patent Number: 5,374,377
[45] Date of Patent: Dec. 20, 1994

[54] PHOSPHORESCENT POLYVINYL CHLORIDE FILMS

[75] Inventors: Bach T. Nguyen; Toshihiro Katagiri, both of Everett, Wash.

[73] Assignee: Achilles Corporation, Tokyo, Japan

[21] Appl. No.: 6,312

[22] Filed: Jan. 19, 1993

[51] Int. Cl.⁵ ............................................. C09K 11/56
[52] U.S. Cl. ....................... 252/301.36; 252/301.6 S
[58] Field of Search ................ 252/301.35, 301.6 S, 252/301.16, 301.36

[56] References Cited

U.S. PATENT DOCUMENTS

| | | | |
|---|---|---|---|
| 3,125,536 | 3/1964 | O'Brien | 252/301.3 |
| 3,185,650 | 5/1965 | Gurnee et al. | 252/301.36 |
| 3,796,668 | 3/1974 | Hickcox | 252/301.2 |
| 3,915,884 | 10/1975 | Kazenas | 252/301.2 |
| 3,936,403 | 2/1976 | Sakaguchi et al. | 260/23 |
| 3,937,666 | 2/1976 | Schafer et al. | 252/301.2 |
| 3,987,229 | 10/1976 | Rairdon et al. | 428/148 |
| 4,208,300 | 6/1980 | Gravisse | 252/301.36 |
| 4,211,813 | 7/1980 | Gravisse et al. | 428/263 |
| 4,695,399 | 9/1982 | Neefe | 252/301.36 |
| 5,135,600 | 8/1992 | Ishida | 428/520 |

FOREIGN PATENT DOCUMENTS

| | | |
|---|---|---|
| 52-092260 | 8/1977 | Japan. |
| 57-177054 | 10/1982 | Japan. |
| 177054 | 10/1982 | Japan. |
| 58-129029 | 8/1983 | Japan. |
| 60-135246 | 7/1985 | Japan. |
| 02-2234984 | 9/1990 | Japan. |

Primary Examiner—John Niebling
Assistant Examiner—Edna Wong
Attorney, Agent, or Firm—Seed and Berry

[57] ABSTRACT

There is disclosed a phosphorescent polyvinyl chloride ("PVC") film which exhibits an intense and long-lived afterglow. The phosphorescent PVC film contains a polymerized PVC-based resin, a primary and secondary plasticizer, a primary and secondary stabilizer, and a phosphorescent pigment. Within the practice of this invention, the primary stabilizer is solely a zinc-based stabilizer (non-zinc metal stabilizers are not employed); the secondary stabilizer is a tertiary organic phosphite; the primary plasticizer is a epoxidized soybean oil; the secondary plasticizer is selected from phthalates, adipates, trimellitates, azelates and phosphates; and the phosphorescent pigment is preferably a zinc sulfide phosphor. In addition to the phosphorescent PVC film, compositions and related methods are also disclosed.

16 Claims, 3 Drawing Sheets

PHOSPHORESCENT POLYVINYL CHLORIDE FILMS

TECHNICAL FIELD

This invention relates generally to a phosphorescent polyvinyl chloride film and, more specifically, to phosphorescent polyvinyl chloride film which exhibits an intense and long-lived afterglow.

BACKGROUND OF THE INVENTION

A polymer is a large molecule formed by the union or polymerization of smaller molecules called monomers. For example, polymerization of vinyl chloride yields the polymer polyvinyl chloride (hereinafter referred to as "PVC"). A polymer formed by the polymerization of two or more different monomers (also called "comonomers") is known as a copolymer. For example, the copolymer polyvinyl chloride acetate is made by the polymerization vinyl chloride and vinyl acetate.

PVC has been used for a number of years in the manufacture of soft, flexible films for food packaging, in molded rigid products (such as pipes, fibers, upholstery and bristles), and in a variety of other products, including electric wire and cable-coverings, film finishes for textiles, raincoats, belting, gaskets and shoe soles.

The addition of fluorescent or phosphorescent pigments to PVC films has lead to their application as signal tapes. These signal tapes are useful on signs and for designating emergency exits and pathways upon lighting failure in buildings, as well as on public transportation such as airplanes and buses. The character of the absorption and emission of light from these pigmented films is dependent upon the nature of the pigment. The emission of light from a film which contains a fluorescent pigment is very, short-lived. Once the excitation source is removed, fluorescent emission typically ceases within nano- to milliseconds. On the other hand, a film which contains a phosphorescent pigment may continue to emit light from seconds to minutes after the excitation source is extinguished. Phosphorescence or long-lived emission is commonly referred to as "afterglow." PVC films which contain phosphorescent pigments provide long-lived emission of light and overcome the practical limitations associated with the lack of afterglow associated with fluorescent films.

Phosphorescent PVC films are traditionally made by the polymerization of vinyl chloride in the presence of the phosphorescent pigment at relatively high temperature. In addition to the phosphorescent pigment and vinyl chloride, polymer formulations typically contain stabilizers to reduce degradation during the polymerization process. Despite the presence of stabilizers, the harsh manufacturing conditions of such films invariably lead to some decomposition of the components of the formulation. Thus, phosphorescent emission from films prepared in this manner suffer from low intensities and shortened durations (i.e., weak and abbreviated afterglows).

Accordingly, there is a need in the art for phosphorescent PVC films which possess improved phosphorescent properties, including strong emission intensities and long emission durations. In addition, there is a need in the art for an improved formulation for the manufacture of such phosphorescent PVC films, as well as methods relating thereto. The present invention fulfills these needs, and provides further related advantages.

SUMMARY OF THE INVENTION

Briefly stated, the present invention discloses a phosphorescent PVC film which exhibits an intense and long-lived afterglow. The phosphorescent PVC film includes a polymerized PVC-based resin, a primary and secondary plasticizer, a primary and secondary stabilizer and a phosphorescent pigment. In a further embodiment, a composition is disclosed for use in the manufacture of the phosphorescent PVC film. This composition contains a polymerizable PVC-based resin, a primary and secondary plasticizer, a primary and secondary stabilizer and a phosphorescent pigment. In yet a further embodiment, a method of manufacturing a phosphorescent PVC film from the above composition is also disclosed.

The primary stabilizer of this invention is solely a zinc-based stabilizer (non-zinc metal stabilizers are not employed), and the secondary stabilizer is a tertiary, organic phosphite. The primary plasticizer is a epoxidized soybean oil, while secondary plasticizers preferably include phthalates, adipates, trimellitates, azelates and phosphates. The phosphorescent pigment is preferably a zinc sulfide phosphor.

Other aspects of the present invention will become evident upon reference to the following drawings and detailed description.

DETAILED DESCRIPTION OF THE INVENTION

Figure 1:
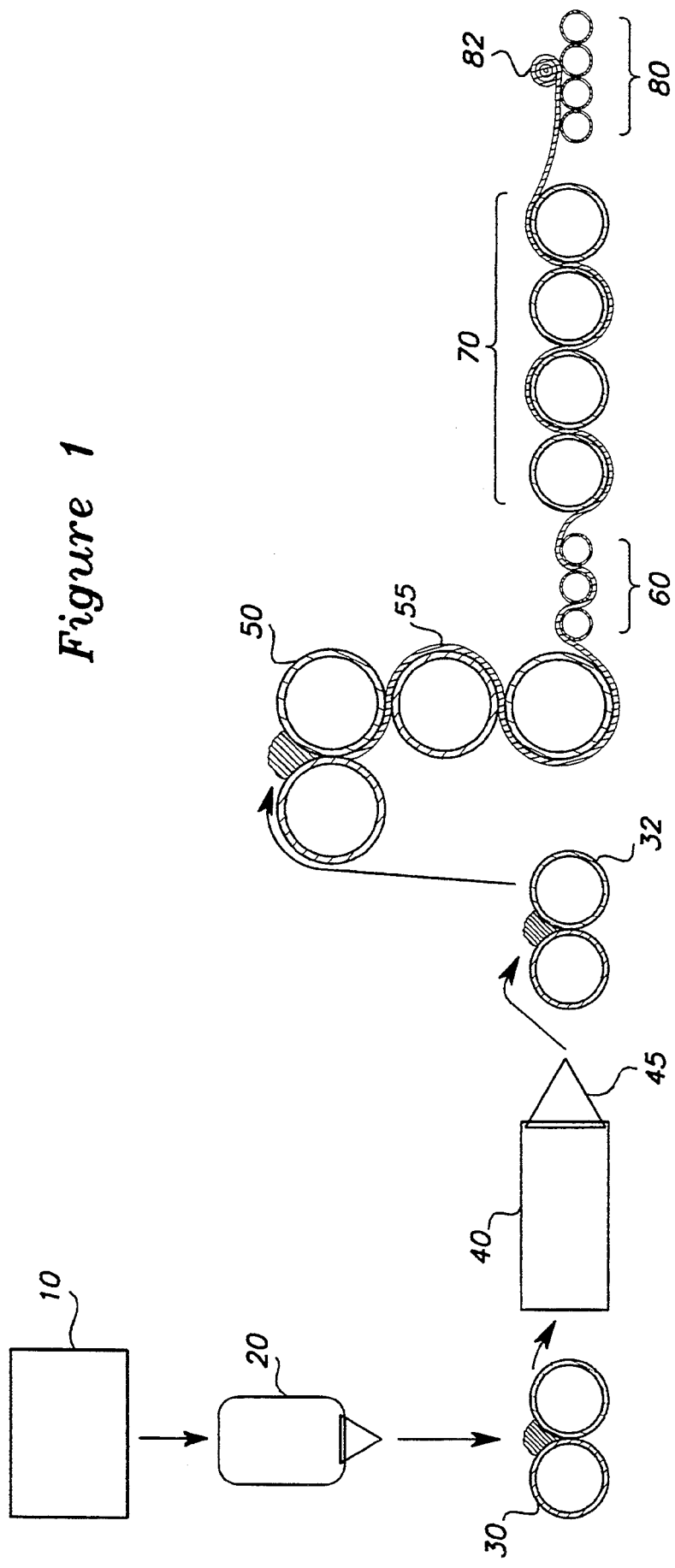
FIG. 1 illustrates the steps of manufacturing a phosphorescent PVC film of the present invention by a calendering process.

This invention discloses a phosphorescent PVC film which exhibits (after excitation) an intense and long-lived emission (commonly referred to as afterglow) of light known as phosphorescence. Phosphorescence is distinguishable from fluorescence, which is the emission of light from a substance which ceases abruptly upon removal of the excitation source. For example, illumination of a phosphorescent PVC film of the present invention for 10 minutes with a common fluorescent office light, typically resulted in an afterglow of about 20 millilumen per square foot after about 10 seconds, and slowly diminished to about 1 millilumen per square foot after approximately thirty minutes. The phosphorescent PVC film of the present invention find wide application and offers an improvement over existing phosphorescent film. Moreover, the phosphorescent PVC film of this invention is particularly useful in dark locations, when the film has been previously illuminated, and the film's afterglow signals a warning or a pathway.

The phosphorescent PVC film of the present invention is made from a composition containing a PVC-based resin, a primary and secondary plasticizer, a primary and secondary stabilizer, and a phosphorescent pigment. As used herein, the term "PVC-based resin" means that the resin includes vinyl chloride monomer, and may optionally include other comonomers. If only the vinyl chloride monomer is present in the PVC-based resin, polymerization of the resin will yield the polymer PVC. If, in addition to vinyl chloride monomer, one or more different comonomers are also present in the PVC-based resin, polymerization of the resin will yield a copolymer. Suitable comonomers include, but are not limited to, vinyl acetate, ethylene, propylene, maleate, methacrylate, acrylate, high alcohol vinyl ester, urethane, chlorinated urethane, methylmethacrylate, and mixtures thereof. The comonomers of the PVC-based resin may also be in the form of blends, which include, but are not limited to, ethylene-vinyl acetate copolymer, acrylonitrile-butadiene-styrene terpolymer, acrylonitrile-butadiene copolymer, and mixtures thereof. Within the PVC-based resin, the comonomers may be present in an amount up to 10 parts per hundred resin. The term "parts per hundred resin" is used herein to define the quantity of a component based on the total weight of the PVC-based resin, and is abbreviated "pphr".

The primary and secondary plasticizers serve to provide flexibility to the phosphorescent PVC film. Preferably, the primary plasticizer is an epoxidized soybean oil, and is present in the composition and film in an amount ranging from 4 to 15 pphr, more preferably from 5 to 10 pphr, and most preferably 5 to 7 pphr. A suitable epoxidized soybean oil is of a grade comparable to that sold by Argus Chemical (Grade Drapex 6.8).

The secondary plasticizer may be selected from phthalates, adipates, trimellitates, azelates, and phosphates, and include (but are not limited to) the following compounds: butyl benzyl phthalate (BBP), di-n-octyl phthalate (DOP), di-2-ethylhexyl phthalate (DEHP), dibutyl phthalate (DBP), diisononyl phthalate (DINP), diisobutyl phthalate (DIBP), didecyl phthalate (DDP), diisodecyl phthalate (DIDP), di-2-ethylhexyl adipate (DOA), diisodecyl adipate (DIDA), diisooctyl adipate (DIOA), tri-2-ethylhexyl trimellitate (TOTM), triisooctyl trimellitate, (TIOTM), tri-n-octyl n-decyl trimellitate (TNODTM), di-2-ethylhexyl azelate (DOZ), triphenyl phosphate (TPP), diphenylisodecyl phosphate (DPIDP), and mixtures thereof. More specifically, secondary phtalate plasticizers include BBP, DOP, DEHP, DBP, DINP, DIBP, DDP, DIDP and mixtures thereof; secondary adipate plasticizers include DOA, DIDA, DIOA and mixtures thereof; secondary trimellitate plasticizers include TOTM, TIOTM, TNODTM and mixtures thereof; secondary azelate plasticizers include DOZ; and secondary phosphate plasticizers include TPP, DPIDP, and mixtures thereof. The secondary plasticizer is present in the composition in an amount ranging from 30 to 90 pphr, preferably from 40 to 70 pphr, and most preferably from 55 to 65 pphr.

In general, stabilizers are used in PVC compositions to eliminate or slow down the process of polymer degradation. Because PVC polymers are sensitive to zinc as a catalyst for polymer degradation, zinc compounds have not previously been used as the sole stabilizer in PVC compositions. While individual zinc stabilizers are available, they have previously only been used in conjunction with other metals (e.g., cadmium, calcium, magnesium, barium, tin and lead), incorporated singly or in pre-combination (e.g., barium/cadmium and calcium/magnesium) with zinc (see PVC Technology, Fourth Ed., W. V. Titow ed., Elsevier Applied Science Publishers pub., pp. 278-279).

In contrast to existing PVC stabilizers, the primary stabilizer of this invention is solely a zinc-based stabilizer, and does not include other metal stabilizers singly or in pre-combination with zinc. The use of other metal stabilizers (i.e., non-zinc stabilizers) impart undesirable properties to the phosphorescent PVC film, including weak and abbreviated afterglow (as illustrated in Examples 3 and 4 below). and are to be avoided. Accordingly, the term "zinc-based stabilizer" as used herein means a stabilizer which contains zinc as the sole metal stabilizer. Preferably, the zinc-based stabilizer includes, but is not limited to, zinc fatty acids. Suitable zinc fatty acids are zinc salts of an alkyl having at least one carboxylic acids moiety. In a preferred embodiment, the zinc fatty acid is a monocarboxylic acid having a hydrocarbon chain containing from 1 to 32 carbon atoms, and includes, but is not limited to, zinc stearate, zinc laurate, zinc oleate, zinc isostearate, zinc decanate, zinc octate, and mixtures thereof. The zinc-based stabilizer of the present invention is present in the composition and film in an amount ranging from 0.8 to 5 pphr, preferably from 1 to 4 pphr, and most preferably from 1 to 3 pphr.

The secondary stabilizer is a tertiary organic phosphite and includes, but is not limited to, diphenyldecyl phosphite, triphenyl phosphite, trisnonylphenyl phosphite, diphenyloctyl phosphite, 4,4-isopropylidenediphenol $C_{12}$-$C_{15}$ alkyl phosphites, and mixtures thereof. The amount of secondary stabilizer present in the composition and film ranges from 1 to 15 pphr, preferably from 2 to 10 pphr, and most preferably 3 to 7 pphr.

The phosphorescent pigment of this invention includes pigments which, upon excitation by ultraviolet or visible light, emit visible radiation at a wavelength greater than the excitation wavelength, and exhibit an emission which persists beyond the extinction of the excitation source. Suitable phosphorescent pigments include, but are not limited to, zinc sulfide phosphors. In addition, the zinc sulfide phosphor may contain zinc sulfide which is doped with either cadmium, calcium, or strontium, and most preferably with copper. The phosphorescent pigment is present in the composition and film in an amount ranging from 50 to 350 pphr, preferably from 100 to 250 pphr, and most preferably 180 to 220 pphr.

The phosphorescent PVC film of the present invention may be made by combining the above components to yield the corresponding composition, which is then made into the phosphorescent PVC film by a suitable PVC film-forming technique. More specifically, the PVC-based resin, primary and secondary plasticizers, primary and secondary stabilizers, and phosphorescent pigment are first combined in the amounts specified above, and mixed by a Henschel mixer and/or a Banbury intensive mixer. The mix may then be calendered and/or extruded to film having a thickness ranging from 0.004 inch to 0.02 inch. Calendering and extrusion processes for forming PVC film are well known in the art (see Encyclopedia of PVC, Leonard L. Nass ed., Marcel Dekker, Inc. pub., Vol. 3, pp. 1251-1312 and 1361-1414, 1977) (which is incorporated herein by reference in its entirety).

The afterglow of the phosphorescent PVC film of this invention may be evaluated instrumentally and/or visually. Phosphorescent PVC films which lack zinc-based stabilizers as the sole primary stabilizer generally exhibit initial afterglow intensities which are 20% less than the phosphorescent PVC films which utilized a zinc-based stabilizer (or mixtures thereof) as the sole primary stabilizer. Furthermore, the intensities of phosphorescent PVC films which contain non-zinc metal stabilizers rapidly diminish. For example, the afterglow of such films after only four minutes is roughly equivalent to the afterglow observed from the phosphorescent PVC film of the present invention after thirty minutes. Moreover, no afterglow is generally detected after ten minutes from phosphorescent PVC films which did not contain the zinc-based stabilizer as the sole stabilizer.

The following examples are provided by way of illustration and not limitation.

EXAMPLES

Example 1

In this example, the manufacture of the phosphorescent PVC films of the present invention is disclosed.

Film 1

The composition of Film 1 was prepared by mixing the following components in the amounts specified:

| | |
|---|---|
| PVC-Based Resin: | |
| PVC resin | 100 pphr |
| Primary plasticizer: | |
| Epoxidized soybean oil | 6 pphr |
| Secondary plasticizer: | |
| Diisononyl phthalate | 60 pphr |
| Primary stabilizer: | |
| Zinc stearate | 1 pphr |
| Secondary stabilizer: | |
| Tertiary organic phosphite | 3 pphr |
| Phosphorescent pigment: | |
| Zinc sulfide phosphor | 200 pphr |

(PVC Resin—Shintech, grade SE-950; Epoxidized soybean oil—Argus Chemical, grade Drapex 6.8; Diisononyl phthalate—Exxon; Zinc stearate—Synthetic Products, grade 8 prill; tertiary organic phosphite—Argus Chemical, grade Mark 1500; Zinc sulfide phosphor—United Mineral Corp., grade 6 SSU).

A phosphorescent PVC film was then manufactured from this composition as illustrated in FIG. 1. Specifically, the above ingredients were mixed in a Hi-speed mixer (10) for 7 minutes (Henshers mixer), then in a Banbury mixer (20) for 5 minutes. The mixture was then passed through a first heated (220° F.–320° F.) roll mill (30) and a heated extruder (40) for screening through a screen (45) (limit 20 mesh/inch). The heated, screened mixture passed through a second heated (220° F.–320° F.) roll mill (32), and was then transferred to a heated (260° F.–340° F.) calender (50) and pressed to form a sheet (55) having a thickness of 0.011 inch. The sheet was removed from the calender by take-off rolls (60) and passed over a series of cooling drums (70). Lastly, the resulting phosphorescent PVC film was wound by a winding system (80) into a roll (82).

Film 2

The composition of Film 2 was the same as for Film 1 except zinc stearate was replaced by the same amount of zinc octate.

Film 3

The composition of Film 3 was the same as for Film 1 except zinc stearate was replaced by the same amount of zinc oleate.

Example 2

In this example, the manufacture of phosphorescent films lacking a zinc-based stabilizer as the sole primary stabilizer is disclosed.

Film 4

The formulation used in the manufacture of Film 4 was the same as for Film 1 of Example 1, except that a barium cadmium-based mixture (Akzo Chemical, grade BC-103L, C-79) at a concentration of 3 pphr was substituted for zinc stearate and tertiary organic phosphite. The formulations which follow for films 5–9 were the same as for that of Film 4 unless otherwise indicated.

Film 5

The barium cadmium-based mixture concentration was changed to 2.5 pphr, and stearic acid was added at a concentration of 0.5 pphr. All other ingredients remained the same.

Film 6

The barium cadmium-based mixture was replaced by a barium zinc-based mixture (UBZ-793, Bearlocher USA at a concentration of 3 pphr. All other ingredients remained the same.

Film 7

The barium cadmium-based mixture was replaced by 3 pphr of a calcium zinc-based mixture (Synpron 1795, Synthetic Products Company, 0.5 pphr; Synpron 231, Synthetic Products Company, 2.5 pphr). All other ingredients remained the same.

Film 8

The barium cadmium-based mixture was replaced by a mixture of tertiary organic phosphite (Argus Chemical, grade Mark 1500) at a concentration of 3 pphr and barium stearate (Synpron Barium Stearate, Synthetic Products) at a concentration of 1 pphr. All other ingredients remained the same.

Film 9.

The barium cadmium-based mixture was replaced by a mixture of tertiary organic phosphite (grade Mark 1500, Argus Chemical) at a concentration of 3 pphr and calcium stearate (Synpron Calcium Stearate, Synthetic Products) at a concentration of 1 pphr. All other ingredients remained the same.

Example 3

This example illustrates the improved afterglow achieved by the phosphorescent PVC films of the present invention (i.e., Films 1–3), as compared to phosphorescent PVC films 4–9 which lacked zinc-based stabilizer as the sole primary stabilizer. In this experiment, an 8 inch by 11 inch portion of film was placed in a black box and illuminated for 10 minutes with Colorgard Luminaire (Gardner Lab Inc.) equipped with standard illuminant D65 (ASTM E-284-81). After the illumination period, the illumination was discontinued and the film's afterglow was measured using a Light International Model IL-1400A Photometer. The intensity of the afterglow for each film was recorded in units of millilumen per square foot as a function of time. The results are tabulated in Table 1 and presented graphically in FIG. 2 and FIG. 3.

TABLE 1

Tabulation of afterglow measurements in units of millilumen per square foot

| Time (minutes) | Film Number | | | | | | | |
|---|---|---|---|---|---|---|---|---|
| | 1 | 2 | 3 | 4–5 | 6 | 7 | 8 | 9 |
| 0.16 | 20.0 | 19.0 | 16.6 | 15.0 | 16.4 | 17.5 | 14.7 | 14.2 |
| 0.33 | 10.7 | 9.9 | 8.4 | 7.0 | 7.7 | 8.0 | 7.0 | 7.4 |
| 0.50 | 7.2 | 6.1 | 5.6 | 4.0 | 4.7 | 5.2 | 4.0 | 4.8 |
| 0.66 | 5.6 | 4.5 | 4.4 | 2.7 | 3.4 | 4.2 | 2.5 | 3.6 |
| 0.83 | 4.4 | 3.5 | 3.6 | 1.9 | 2.7 | 2.9 | 1.8 | 2.9 |
| 1 | 3.7 | 2.5 | 3.5 | 1.4 | 2.3 | 2.0 | 1.3 | 1.7 |
| 2 | 2.2 | 2.0 | 2.5 | 0.4 | 1.2 | 1.1 | 0.4 | 0.4 |
| 3 | 1.8 | 1.3 | 2.0 | 0.2 | 0.9 | 0.8 | 0.3 | 0.3 |
| 4 | 1.8 | 1.2 | 1.4 | 0 | 0.7 | 0.7 | 0.2 | 0.2 |
| 5 | 1.6 | 0.9 | 1.2 | 0 | 0.5 | 0.5 | 0 | 0 |
| 6 | 1.4 | 0.7 | 1.0 | 0 | 0.2 | 0.3 | 0 | 0 |
| 7 | 1.4 | 0.7 | 0.9 | 0 | 0 | 0.2 | 0 | 0 |
| 8 | 1.2 | 0.6 | 0.8 | 0 | 0 | 0.2 | 0 | 0 |
| 9 | 1.1 | 0.5 | 0.7 | 0 | 0 | 0 | 0 | 0 |
| 10 | 1.1 | 0.5 | 0.7 | 0 | 0 | 0 | 0 | 0 |
| 15 | 1.0 | 0.4 | 0.6 | 0 | 0 | 0 | 0 | 0 |
| 20 | 1.0 | 0.4 | 0.6 | 0 | 0 | 0 | 0 | 0 |
| 30 | 0.7 | 0.3 | 0.5 | 0 | 0 | 0 | 0 | 0 |

Figure 2:
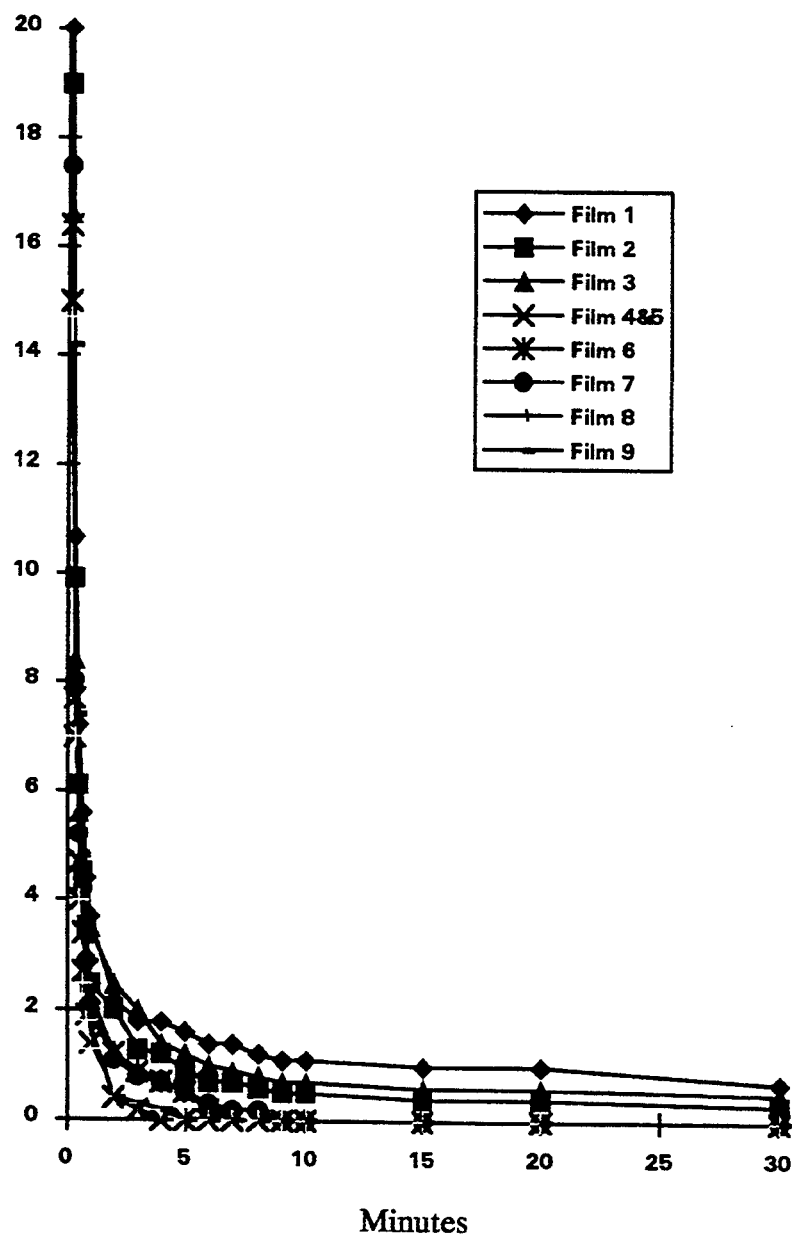
FIG. 2 illustrates comparison afterglow profiles (intensity versus time) for various phosphorescent PVC films.
Figure 3:
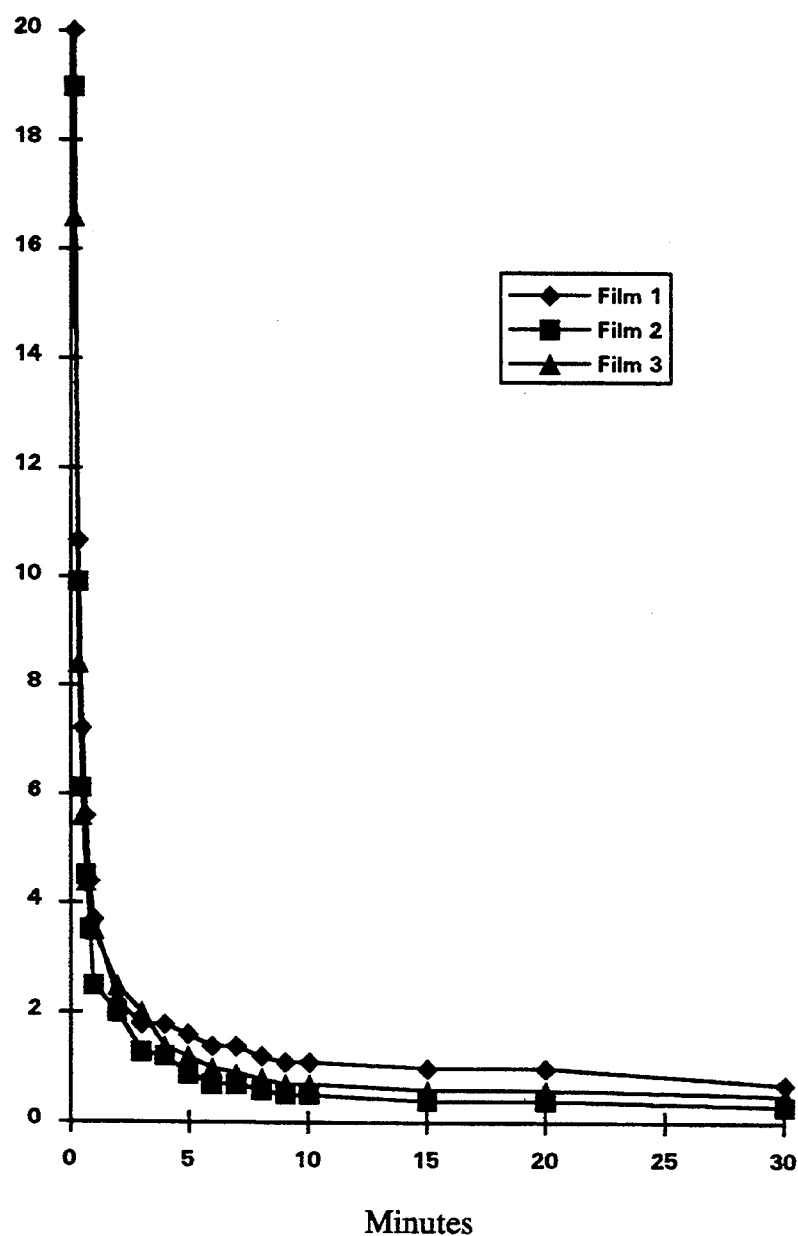
FIG. 3 illustrates the afterglow profiles (intensity versus time) of several phosphorescent PVC films of this invention.

The phosphorescent PVC films of the present invention (films 1–3) exhibited afterglows which were stronger in intensity and longer in duration than those films which lacked zinc-based stabilizer as the sole stabilizer (films 4–9). For example, for Film 1 the afterglow after approximately 10 seconds was 20.0 millilumen per square foot and was still detectable after 30 minutes. In contrast, the best performing film lacking the zinc-based stabilizer as the sole stabilizer (film 7) exhibited an afterglow after 10 seconds which was 17.5 millilumen per square foot and was not detectable 9 minutes after illumination. FIG. 2 illustrates the superior properties of the phosphorescent PVC films of this invention (e.g., films 1–3) compared to films 4–9. FIG. 3 presents the data of Table 2 for representative films 1–3 of this invention.

Example 4

In this example, the afterglow of each of the phosphorescent films of Example 1 and Example 2 was visually evaluated. The films were identically exposed to fluorescent lighting followed by the observation by eye of the resulting afterglow in the dark. The visual comparison rated the initial intensity and the duration of the afterglow. The ratings are defined as follows:

Excellent: initial afterglow is very bright and had a duration greater than 2 hours
Good: initial afterglow is very bright and had a duration between 1 and 2 hours
Average: initial afterglow is good and had a duration between 1 and 2 hours
Poor: initial afterglow is weak and had a duration less than 1 hour.

The results of this experiment are tabulated below in Table 2.

TABLE 2

Visual rating of afterglow of phosphorescent films

| Film | Rating |
|---|---|
| 1 | Excellent |
| 2 | Good |
| 3 | Good |
| 4 | Poor |
| 5 | Poor |
| 6 | Average |
| 7 | Average |
| 8 | Average |
| 9 | Average |

The phosphorescent PVC films of the present invention exhibit visible afterglows which are stronger in intensity and longer in duration than those films which lacked zinc-based stabilizer as the sole stabilizer.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A phosphorescent PVC film, consisting essentially of a polymerized PVC-based resin; a primary epoxidized soybean oil plasticizer in an amount ranging from 4 to 15 parts per hundred resin; a secondary plasticizer in an amount ranging from 30 to 90 parts per hundred resin, wherein the secondary plasticizer is selected from the group consisting of phthalates, adipates, trimellitates, azelates, and phosphates; a primary zinc-based stabilizer which contains zinc as the sole metal stabilizer in an amount ranging from 0.8 to 5 parts per hundred resin; a tertiary organic phosphite as a secondary stabilizer in an amount ranging from 1 to 15 parts per hundred resin; and a phosphorescent pigment in an amount ranging from 50 to 350 parts per hundred resin, wherein the phosphorescent pigment is a zinc sulfide phosphor.

2. The film of claim 1 wherein the primary zinc-based stabilizer is selected from the group consisting of zinc stearate, zinc laurate, zinc oleate, zinc isostearate, zinc decanate, zinc octate, and mixtures thereof.

3. The film of claim 1 wherein the secondary phthalate plasticizer is selected from the group consisting of butyl benzyl phthalate, di-n-octyl phthalate, di-2-ethylhexyl phthalate, dibutyl phthalate, diisononyl phthalate, diisobutyl phthalate, didecyl phthalate, diisodecyl phthalate, and mixtures thereof.

4. The film of claim 1 wherein the secondary adipate plasticizer is selected from the group consisting of di-2-ethylhexyl adipate, diisodecyl adipate, diisooctyl adipate, and mixtures thereof.

5. The film of claim 1 wherein the secondary trimellitate plasticizer is selected from the group consisting of tri-2-ethylhexyl trimellitate, triisooctyl trimellitate, tri-n-octyl n-decyl trimellitate, and mixtures thereof.

6. The film of claim 1 wherein the secondary azelate plasticizer is di-2-ethylhexyl azelate.

7. The film of claim 1 wherein the secondary phosphate plasticizer is selected from the group consisting of triphenyl phosphate, isodecyldiphenyl phosphate, and mixtures thereof.

8. The film of claim 1 wherein the tertiary organic phosphite is selected from the group consisting of diphenyldecyl phosphite, triphenyl phosphite, trisnonylphenyl phosphite, diphenyloctyl phosphite, isopropylidenediphenol $C_{12}$–$C_{15}$ alkyl phosphite, and mixtures thereof.

9. A composition for forming a phosphorescent PVC film, consisting essentially of a polymerized PVC-based resin; a primary epoxidized soybean oil plasticizer in an amount ranging from 4 to 15 parts per hundred resin; a secondary plasticizer in an amount ranging from 30 to 90 parts per hundred resin, wherein the secondary plasticizer is selected from the group consisting of phthalates, adipates, trimellitates, azelates, and phosphates; a primary zinc-based stabilizer which contains zinc as the sole metal stabilizer in an amount ranging from 0.8 to 5 parts per hundred resin; a tertiary organic phosphite as a secondary stabilizer in an amount ranging from 1 to 15 parts per hundred resin; and a phosphorescent pigment in an amount ranging from 50 to 350 parts per hundred resin, Wherein the phosphorescent pigment is a zinc sulfide phosphor.

10. The composition of claim 9 wherein the zinc-based stabilizer is selected from the group consisting of zinc stearate, zinc laurate, zinc oleate, zinc isostearate, zinc decanate, zinc octate, and mixtures thereof.

11. The composition of claim 9 wherein the secondary phthalate plasticizer is selected from the group consisting of butyl benzyl phthalate, di-n-octyl phthalate, di-2-ethylhexyl phthalate, dibutyl phthalate, diisononyl phthalate, diisobutyl phthalate, didecyl phthalate, diisodecyl phthalate, and mixtures thereof.

12. The composition of claim 9 wherein the secondary adipate plasticizer is selected from the group consisting of di-2-ethylhexyl adipate, diisodecyl adipate, diisooctyl adipate, and mixtures thereof.

13. The composition of claim 9 wherein the secondary trimellitate plasticizer is selected from the group consisting of tri-2-ethylhexyl trimellitate, triisooctyl trimellitate, tri-n-octyl n-decyl trimellitate, and mixtures thereof.

14. The composition of claim 9 wherein the secondary, azelate plasticizer is di-2-ethylhexyl azelate.

15. The composition of claim 9 wherein the secondary phosphate plasticizer is selected from the group consisting of triphenyl phosphate, isodecyldiphenyl phosphate, and mixtures thereof.

16. The composition of claim 9 wherein the tertiary organic phosphite is selected from the group consisting of diphenyldecyl phosphite, triphenyl phosphite, trisnonylphenyl phosphite, diphenyloctyl phosphite, isopropylidenediphenol $C_{12}$–$C_{15}$ alkyl phosphite, and mixtures thereof.

* * * * *